United States Patent
Hu

[11] Patent Number: 5,957,544
[45] Date of Patent: Sep. 28, 1999

[54] WHEEL FIXING DEVICE FOR A BABY STROLLER

[76] Inventor: Stephen Hu, No 2, Ta-Tung Rd., Hsin-Chu, Industrial Park, Taiwan

[21] Appl. No.: 09/083,636

[22] Filed: May 22, 1998

[51] Int. Cl.⁶ .................................................. B60B 27/02
[52] U.S. Cl. ........................ 301/111; 280/47.38; 301/121
[58] Field of Search ................................ 301/111, 113, 301/118, 119, 120, 121, 122; 280/642, 650, 47.38

[56] References Cited

U.S. PATENT DOCUMENTS

| 4,043,685 | 8/1977 | Hyams | 301/121 X |
| 4,913,610 | 4/1990 | Olivieri | 301/120 X |
| 5,215,356 | 6/1993 | Lin | 301/111 |
| 5,224,961 | 7/1993 | Liu | 301/111 |
| 5,277,480 | 1/1994 | Chiu | 301/111 |

Primary Examiner—J. J. Swann
Assistant Examiner—Michael Mar
Attorney, Agent, or Firm—Pro-Techtor International Services

[57] ABSTRACT

A fixing device for a wheel of a baby stroller utilizes an axle hole of the wheel formed to receive a rotation axle provided with a recessed neck. The device includes a sleeve provided in the axle hole of the wheel with a receiving chamber. The sleeve includes a pipe to receive the rotation axle. A spring loaded push button is also provided in the receiving chamber. When the push button is pushed down to force positioning rods to slide in inclined slots of the push button, the positioning rods exit a recessed neck of the pipe, and the wheel can be removed from the rotation axle. The device allows fast assembly and disassembly of the wheels so that a customer can maintain and change the wheels by himself. The device also allows the reduction of volume for packaging to increase shipping capability.

3 Claims, 5 Drawing Sheets

WHEEL FIXING DEVICE FOR A BABY STROLLER

BACKGROUND OF THE INVENTION

1. Field of the Invention

The present invention is related to a wheel fixing device for baby strollers, and especially to a device which allows the wheels of the baby stroller to be assembled and disassembled quickly for maintenance and changing of the wheels, and for self-assembly by users.

2. Description of the Prior Art

Wheels on conventional baby strollers normally are permanently fixed on the wheel axles. The baby stroller is packaged with the wheels attached for sale as a unit. Hence in using the baby stroller, when the wheels are worn out, a user is unable to repair or change them by himself. The baby stroller is intended to be sent to a factory or the manufacturer for repair, and this is very inconvenient. Further, the wheels being directly and permanently fixed on the wheel axles of the baby stroller increase the volume of packaging and decrease the shipping capability, thereby increasing the cost of shipment.

SUMMARY OF THE INVENTION

In view of this, the inventor of the present invention studied hard on a wheel fixing device for baby strollers that would allow fast assembly and disassembly of the wheels so that a customer can maintain and change the wheels by himself.

Another object of the present invention is to provide a wheel fixing device for baby strollers that reduces the volume of packaging to increase shipping capability.

The present invention will be apparent to those skilled in the art after reading the detailed description of the preferred embodiment of the present invention in reference to the accompanying drawings.

DETAILED DESCRIPTION OF THE PREFERRED EMBODIMENT

Figure 1:
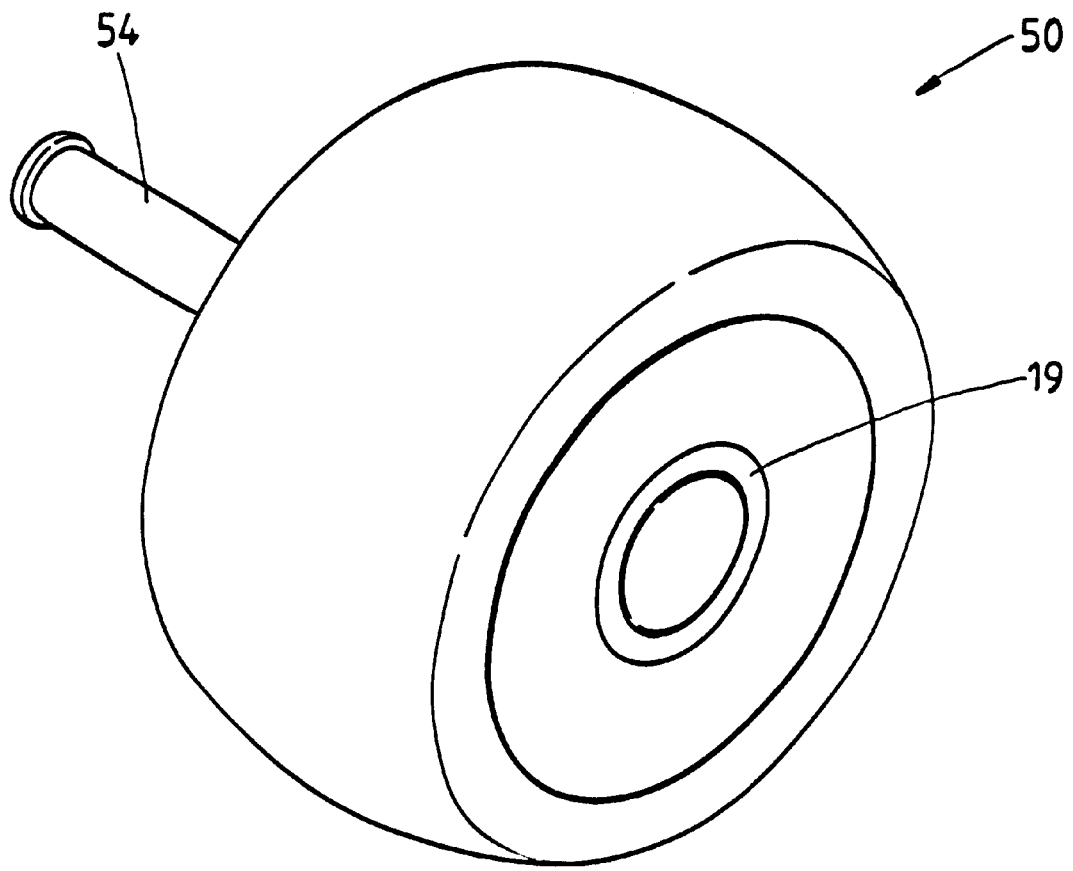
FIG. 1 is a perspective view showing a wheel including the device of the present invention.
Figure 2:
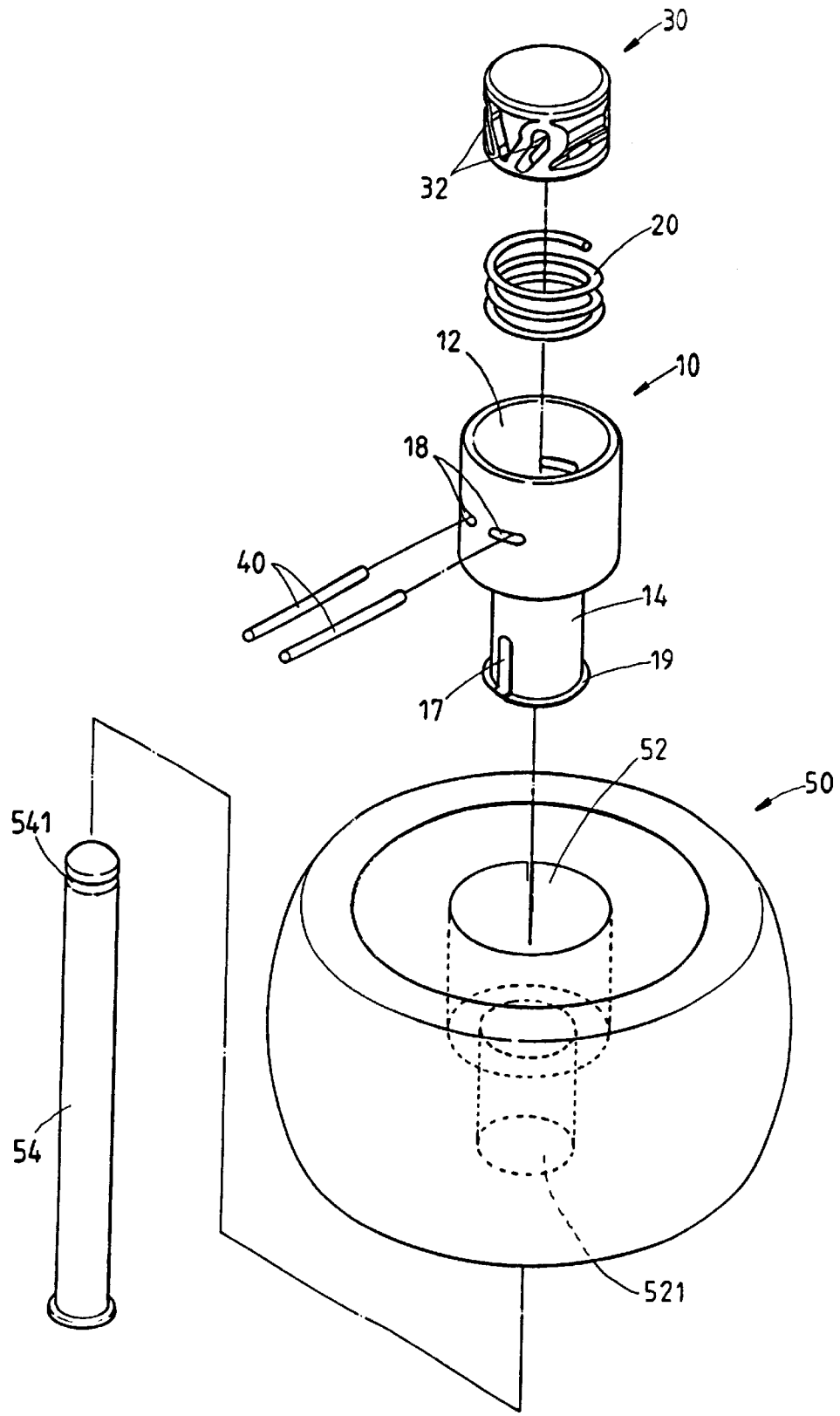
FIG. 2 is a perspective view of the device of the present invention.

Referring first to FIGS. 1 and 2 of the drawings, the wheel fixing device for baby strollers of the present invention is comprised of a sleeve 10, a spring 20, a push button 30, and two positioning rods 40. The wheel fixing device is fitted in the axle hole 52 of a wheel 50 of a baby stroller. A rotation axle 54 of the baby stroller is engaged in the fixing device to firmly connect the wheel 50 of the baby stroller and the rotation axle 54.

The sleeve 10 is positioned in the axle hole 52 of the wheel 50, and includes a receiving chamber 12. The receiving chamber 12 includes a pipe 14 to receive the rotation axle 54. A stop bottom surface 16 (FIG. 3) is situated between the inner wall of the sleeve 10 and the pipe 14 to receive one end of the spring 20 when the spring 20 is placed in the sleeve 10. Four transverse slots 18 (in two sets) are provided on the wall of the sleeve 10. In this embodiment one end of the pipe 14 protrudes beyond the receiving chamber 12 of the sleeve 10. The end of the protrusion is provided with a slit 17 so that the sleeve 10 has an elastic compression capability. An annular flange 19 is provided on the lower end of the pipe 14.

Figure 4:
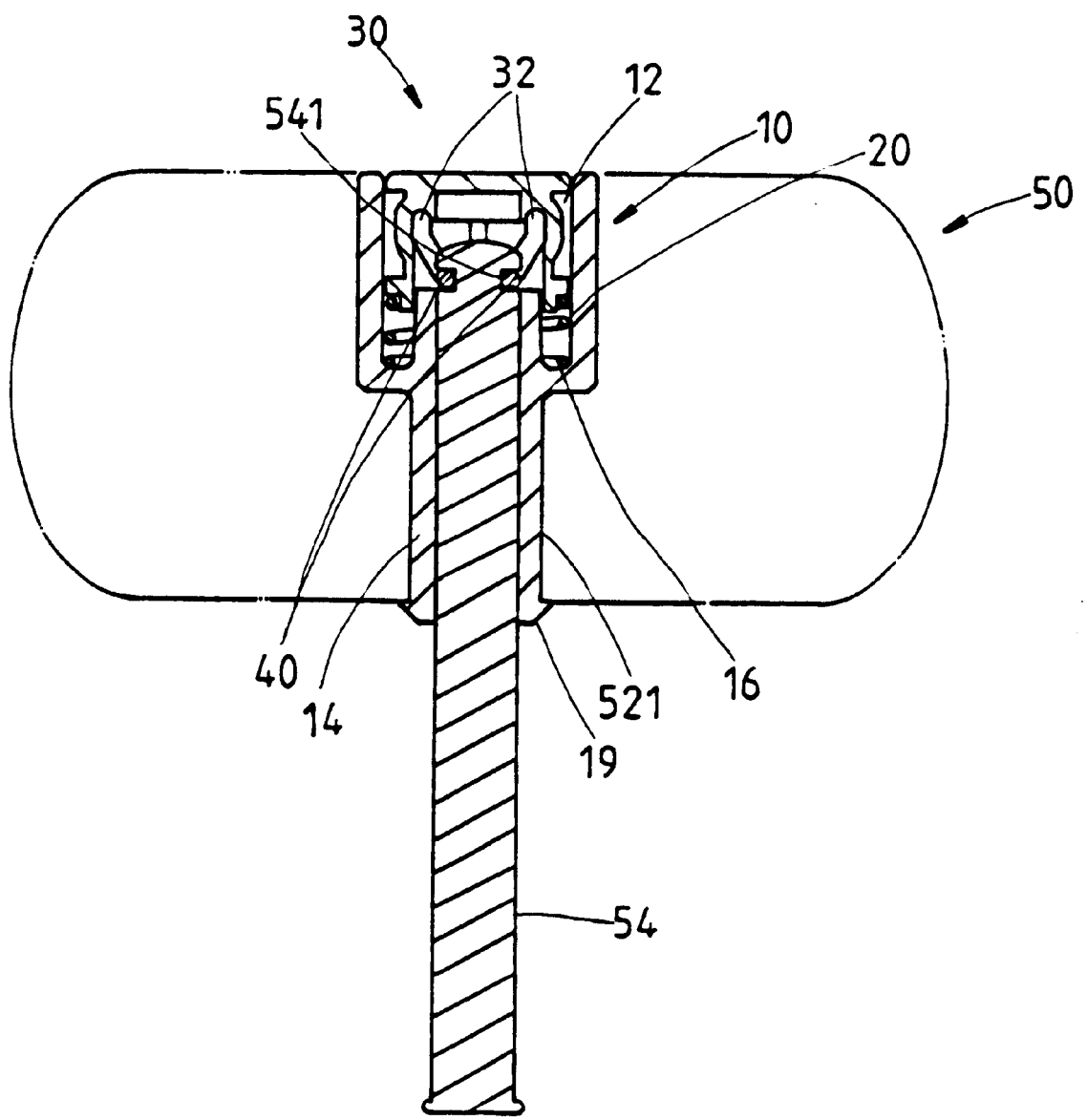
FIG. 4 is a sectional view showing an embodiment of the present invention.

The axle hole 52 of the wheel 50 of the baby stroller is formed to have a through hole 521 which has a diameter conforming to that of the pipe 14 (as shown in FIG. 4), so that the pipe 14 can be inserted in the through hole 521. The annular flange 19 engages and abuts the axle hole 52 of the wheel 50 so that the sleeve 10 is secured on the wheel 50.

The spring 20 is placed in the receiving chamber 12 of the sleeve 10, and is fitted over the pipe 14. One end of the spring 20 abuts the stop bottom surface 16.

The push button 30 is also included in the receiving chamber 12 of the sleeve 10. One end of the push button 30 abuts the spring 20 in the receiving chamber 12, so that the push button 30 is provided with an elastic restoring force. Four inclined slots 32 (also in two sets) are provided on the side wall of the push button 30, and correspond in position to the two set of transverse slots 18.

The two positioning rods 40 are provided to extend through the transverse slots 18 of the sleeve 10 and the inclined slots 32 of the push button 30, so that the two positioning rods 40 are located at the bottoms of the inclined slots 32. A recessed neck 541 is provided on the top end of the rotation axle 54 to receive the two positioning rods 40 so that the rotation axle 54 can be fixed on the sleeve 10 and is secured to the push button 30.

Figure 3:
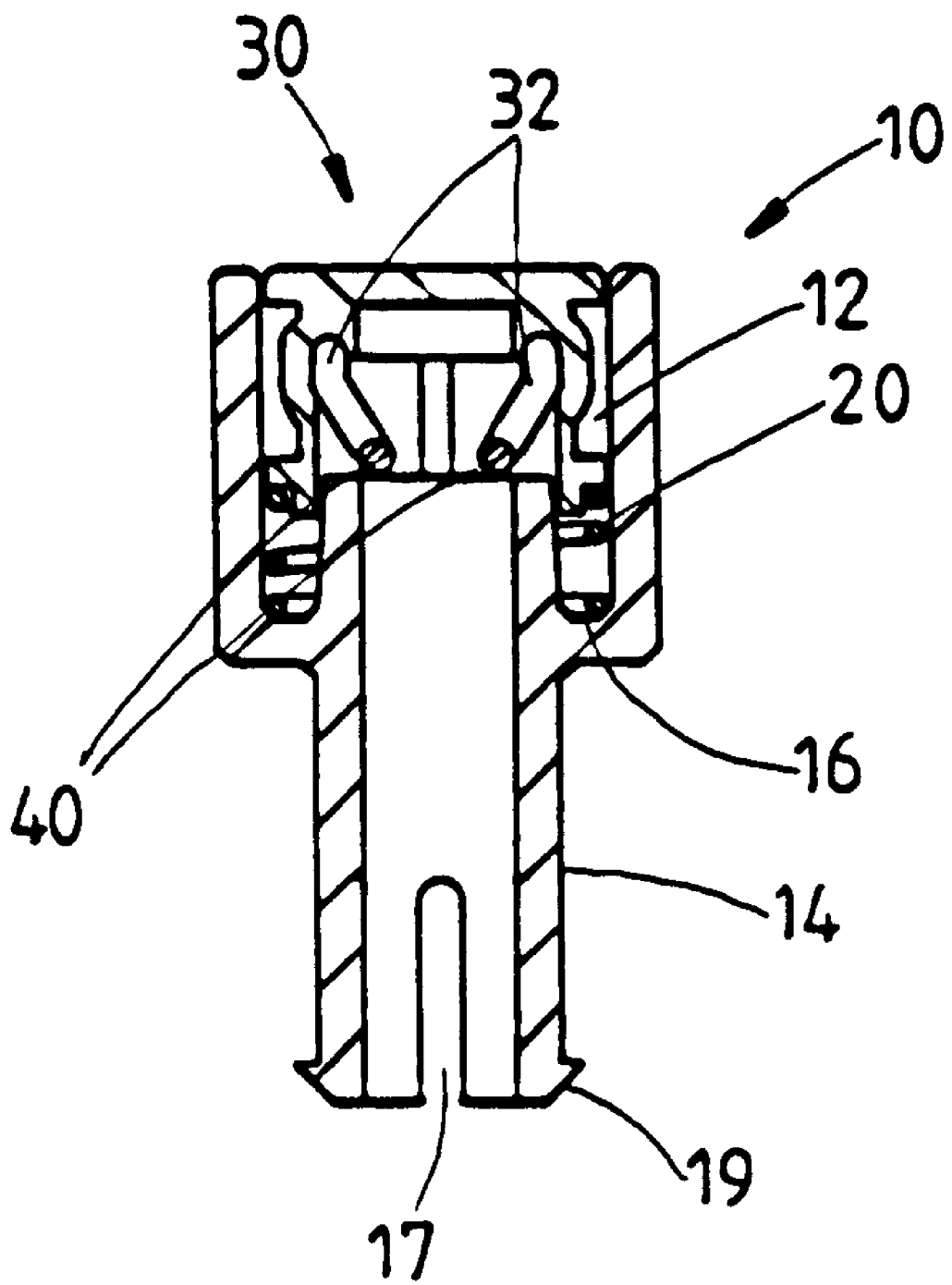
FIG. 3 is a sectional view showing assembly of the present invention.

Referring to FIG. 3, when assembling the fixing device of the present invention, the spring 20 and the push button 30 are sequentially placed into the receiving chamber 12 of the sleeve 10. The two positioning rods 40 are inserted into the transverse slots 18 of the sleeve 10 and the inclined slots 32 of the push button 30. Then the assembled fixing device is placed in the axle hole 52 of the wheel 50 so that the annular flange 19 on the pipe 14 of the sleeve 10 engages and abuts the end of the axle hole 52 of the wheel 50.

Referring to FIG. 4, which is a sectional view showing an embodiment of the wheel fixing device of the baby stroller of the present invention, when the assembled fixing device is placed in the axle hole 52 of the wheel 50, the pipe 14 of the sleeve 10 is compressed due to the slit 17. The annular flange 19 passes through the through hole 521 of the wheel 50. The annular flange 19 engages and rests on the end of the axle hole 52 of the wheel 50.

The rotation axle 54 is extended through the axle hole 52 of the wheel 50 fitted with the fixing device so that the top of the rotation axle 54 pushes the two positioning rods 40 (as shown in FIG. 3) upward to move along the inclined slots 32 of the push button 30. The positioning rods 40 engage the recessed neck 541 of the rotation axle 54 when the top of the rotation axle 54 passes the two positioning rods 40.

Figure 5:
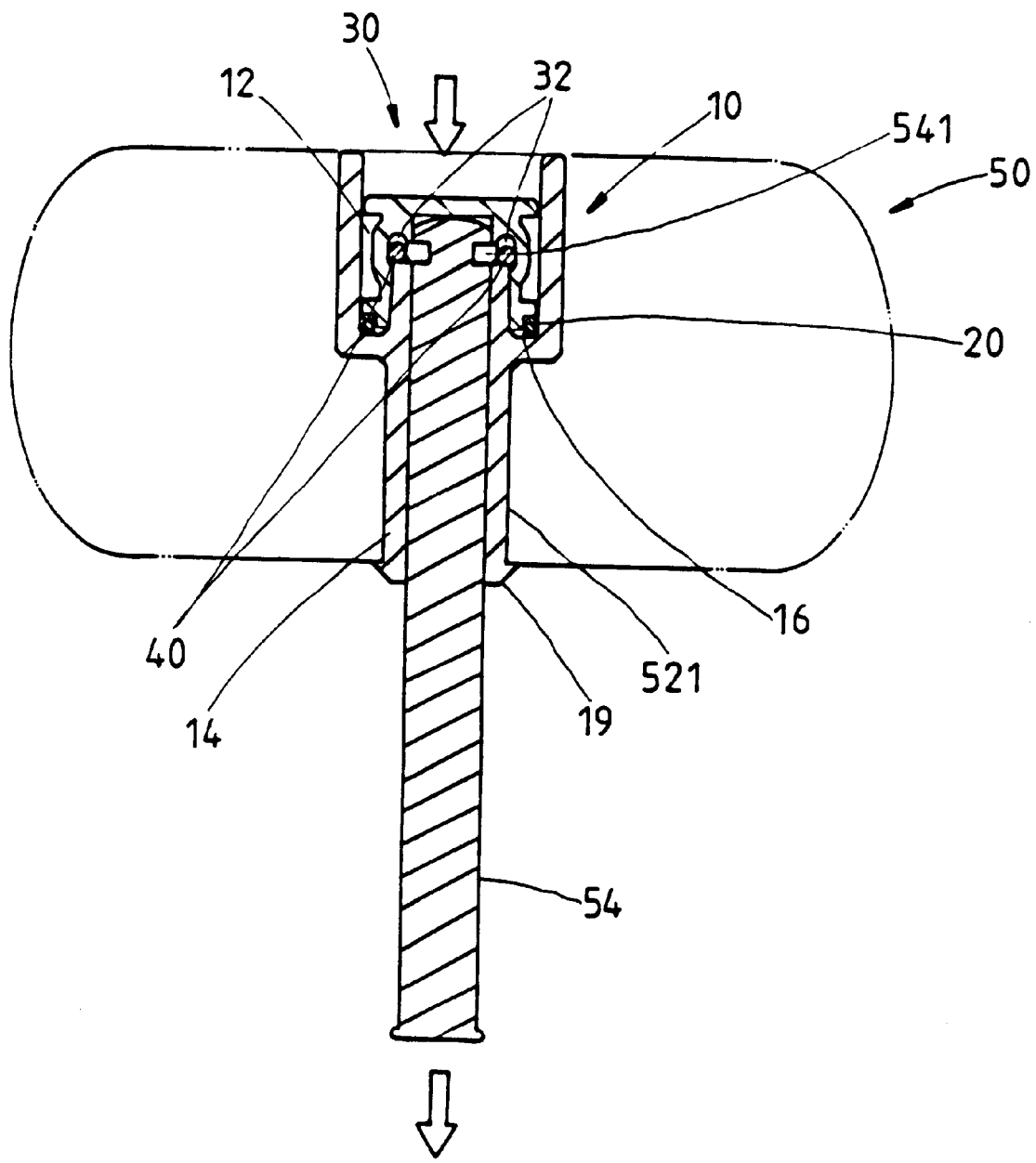
FIG. 5 is a sectional view showing the motion of the present invention.

When dismantling the wheel 50 from the rotation axle 54, referring to FIG. 5, the push button 30 is pushed down to force the two positioning rods 40 to slide downward in the inclined slots 32 of the push button 30. The distance between the two positioning rods 40 is increased, and the two positioning rods 40 are removed from the recessed neck 541 of the rotation axle 54. In this way, the wheel 50 can be removed from the rotation axle 54 in a very convenient operation.

Moreover, when the wheel 50 is to be mounted on the rotation axle 54, the rotation axle 54 can be inserted directly into the receiving chamber 12 of the sleeve 10. The positioning rods 40 will be slightly pushed upward, and will then drop directly into the recessed neck 541 of the rotation axle 54. The rotation axle 54 and the wheel 50 are then firmly engaged, and assembly of the wheel 50 is thus completed.

Although this invention has been disclosed and illustrated with reference to a particular embodiment, the principles involved are susceptible to use in numerous other embodiments which will be apparent to persons skilled in the art without departing from the spirit and scope of this invention.

I claim:

1. A fixing device for removably attaching a wheel to a wheel supporting axle of a baby stroller, the wheel having an axle hole for insertion of the axle, the axle being provided with a recessed neck at an outer end thereof, the fixing device comprising:

a sleeve provided in said axle hole of said wheel, said sleeve having a receiving chamber for receiving a first end of a pipe affixed thereto, said axle being receivable within said pipe, a stop wall formed between an inner wall of said sleeve and said pipe, and two pairs of opposed transverse slots formed in the wall of said sleeve;

a spring positioned within the receiving chamber of said sleeve, one end of said spring abutting said stop wall;

a push button received within an open end of the receiving chamber of said sleeve, an inner end of said push button abutting said spring for biasing said push button in a direction outwardly of said sleeve, two pairs of opposed inclined slots formed in the side wall of said push button and respectively aligned with said two pairs of transverse slots; and two laterally spaced positioning rods respectively extending through opposed ones of said transverse slots of said sleeve and said inclined slots of said push button, said two positioning rods having inner opposed portions adapted to be received within said recessed neck of said axle when said axle is inserted into said sleeve for attaching said wheel to said stroller;

wherein said wheel is removable from said stroller when said push button is pushed inwardly into said sleeve to force said two positioning rods to slide apart within said inclined slots of said push button, thereby moving said two positioning rods out of engagement with said recessed neck for permitting said axle to be removed from said sleeve.

2. A fixing device as claimed in claim 1, wherein a second end of said pipe protrudes outwardly of said sleeve, said second end of said pipe having a longitudinal slit for providing said pipe with an elastic compression capability for retaining said pipe within said axle hole.

3. A fixing device as claimed in claim 2, wherein said second end of said pipe includes an annular flange adapted to be engaged by an end of said axle hole.

* * * * *